United States Patent [19]
Carter et al.

[11] Patent Number: 6,108,619
[45] Date of Patent: Aug. 22, 2000

[54] METHOD AND APPARATUS FOR SEMANTIC CHARACTERIZATION OF GENERAL CONTENT STREAMS AND REPOSITORIES

[75] Inventors: Stephen R. Carter, Spanish Fork; Delos C. Jensen, Orem; Donald H. LaVange, Jr., Pleasant Grove, all of Utah

[73] Assignee: Novell, Inc., Provo, Utah

[21] Appl. No.: 09/109,804

[22] Filed: Jul. 2, 1998

[51] Int. Cl.$^7$ .................................................. G06F 17/27
[52] U.S. Cl. ........................................................ 704/9
[58] Field of Search ................................ 704/9, 10, 8, 1; 707/530, 531, 532, 533, 1, 2, 3, 4, 5, 6, 100, 102, 103, 104

[56] References Cited

U.S. PATENT DOCUMENTS

| | | | |
|---|---|---|---|
| 5,551,049 | 8/1996 | Kaplan et al. | 707/532 |
| 5,675,819 | 10/1997 | Schuetze | 704/10 |
| 5,721,897 | 2/1998 | Rubinstein | 707/2 |
| 5,778,378 | 7/1998 | Rubin | 707/103 |
| 5,822,731 | 10/1998 | Schultz | 704/256 |
| 5,867,799 | 2/1999 | Lang et al. | 707/1 |
| 5,966,686 | 10/1999 | Heidorn et al. | 704/9 |
| 5,974,412 | 10/1999 | Hazlehurst et al. | 707/3 |
| 5,991,713 | 11/1999 | Unger et al. | 704/9 |

OTHER PUBLICATIONS

Applications of Functional Analysis and Operator Theory, V. Hutson, J. S. Pym, 1980, table of contents, preface and index.

Latent Semantic Indexing is an Optimal Special Case of Multidimensional Scaling, Brian T. Bartell, Garrison W. Cottrell, Richard K. Belew, pp. 161–167, 1992; ACM 0–89791–524–0.

Improving Relevance Feedback in the Vector Space Model, Carol Lundquist, David A. Grossman, Ophir Frieder, 1997, pp. 16–23; ACM 0–89791–970–X.

A Multilevel Approach to Intelligent Information Filtering: Model, System, and Evaluation, J. Mostafa, S. Mukhopadhyay, W. Lam, M. Palakal, ACM Transactions on Information Systems, vol. 15, No. 4, Oct. 1997, pp. 368–399.

Capturing the State of Distributed Systems with XML, Rohit Khare and Adam Rifkin, Oct. 26, 1997, pp. 1–12.

Semantic Information Retrieval, Annelise Mark Pejtersen, pp. 90–92, Communications of the ACM, Apr. 1998/vol. 41, No. 4.

Unifying Heterogeneous Information Models, Narinder Singh, pp. 37–44, Communications of the ACM, May 1998/vol. 41, No. 5.

Platform for Internet Content Selection (PICS), Jan. 3, 1998, http://www.w3.org/pics/.

Intelligent Collaboration & Visualization, pp. 1–16.

*Primary Examiner*—Joseph Thomas
*Attorney, Agent, or Firm*—Marger, Johnson & McCollom, P.C.

[57] ABSTRACT

A method in a system comprises accessing a content stream and parsing the content stream into phrases. One or more tokens are determined, at least partially based on the extracted phrases. One or more profiles are associated with the tokens. One or more semantic records are instantiated from the profiles. The semantic record is compared with other semantic records.

20 Claims, 6 Drawing Sheets

METHOD AND APPARATUS FOR SEMANTIC CHARACTERIZATION OF GENERAL CONTENT STREAMS AND REPOSITORIES

TECHNICAL FIELD

The present invention relates generally to information networks, and will be specifically disclosed as a method and apparatus for semantic characterization of content streams related to computer systems.

BACKGROUND OF THE INVENTION

The virtual explosion of technical advances in microelectronics, digital computers and software have changed the face of modern society. In fact, these technological advances have become so important and pervasive that this explosion is sometimes referred to as "the information revolution." Through telephone lines, cables, satellite communications and the like, information and resources are ever increasingly being accessed and shared.

Some attempts have been made for computers and software to interpret and understand the content of data. One such attempt is sometimes referred to as linguistic morphology, which in general terms involves applying computational language mechanisms to text. For instance, a two or three page report could be summarized to produce an outline of topics or an abstract using linguistic morphological techniques.

Another attempt for computers to understand content is to attaching a header or description along with a data, such as a PICS (Platform for Internet Content Selection). PICS are used to tag data so as to provide metadata about the content of the data. For instance, a PICS header can be used to indicate where content is violent, pornographic, or the like. PICS typically requires the cognitive input of a human to determine the content of the metadata.

Several search engines, often used with the Internet such as ALTAVISTA and EXCITE, provide relevancy determinations. For instance, when searching for information on the Internet, the search engine will list the Internet sites in order of apparent relevance, and in some instances provide a numerical indication as to the relevance. Typically, relevancy determinations are a function of the number or proximity of "hits" from the search query in the site.

SUMMARY OF THE INVENTION

One aspect of the present invention is a computer system having a network with a plurality of principals. A content stream in the network has a plurality of phrases and is associated with at least one principal. A plurality of tokens are each associated with one or more of the phrases. A plurality of profiles are each associated with one or more of the tokens. One or more semantic records are each associated with a profile and a principal.

Another aspect of the present invention is a method in a computer system. A content stream is accessed and tokens are extracted from the content stream. One or more profiles are associated with the extracted tokens. At least a portion of the content stream is represented in a semantic space corresponding to one or more profiles.

Still another aspect of the present invention is method in a computer system. A content stream is accessed and parsed into phrases. One or more tokens are determined at least partially based on the extracted phrases. One or more profiles are associated with the tokens. A semantic record is instantiated from the profiles. The semantic record is compared with other semantic records.

Still other aspects of the present invention will become apparent to those skilled in the art from the following description of a preferred embodiment, which is by way of illustration, one of the best modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

Reference will now be made to the present preferred embodiment of the invention, an example of which is illustrated in the accompanying drawings, wherein like numerals indicate the same element throughout the views.

DETAILED DESCRIPTION

Often computers communicate between each other and share information, applications and/or services. Computers or computer systems are generally any device capable of processing data in accordance with one ore more instructions. Examples of computers include personal computers, workstations, servers, mainframes, embedded systems, microprocessors, discrete logic systems, analog systems, and the like. Sometimes in the setting of interconnected computers, the various computers are referred to as nodes, which is a generic term referring to a point in a interconnected system.

Figure 1:
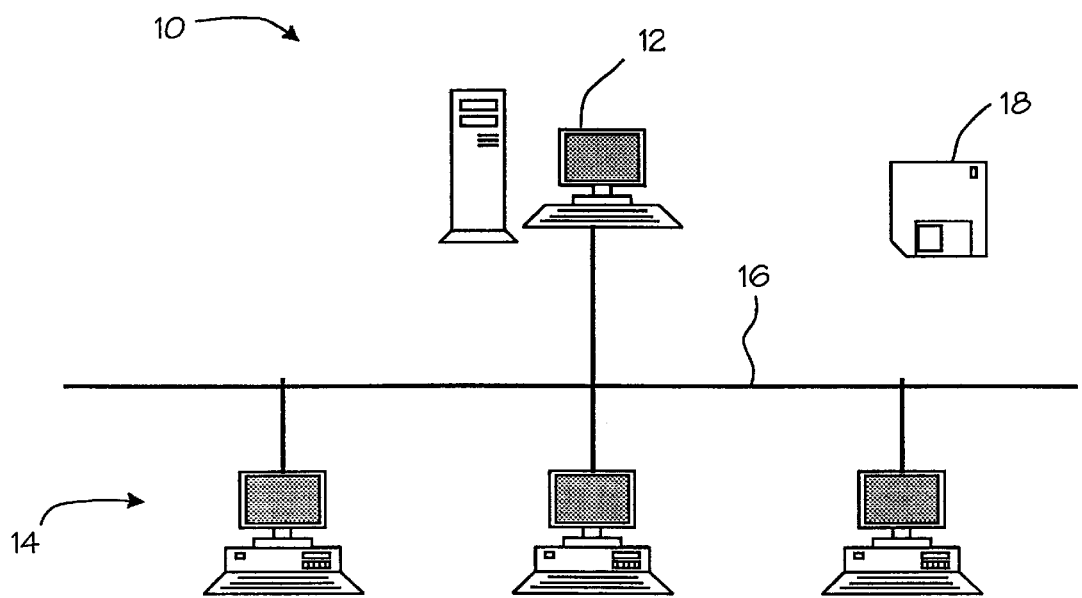
FIG. 1 illustrates an example of a computer network.

FIG. 1 illustrates a sample client/server network 10. As one with ordinary skill in the art will readily appreciate, a client/server network is only one type of network, and a variety of other configurations, such as local area networks, wide area networks, peer-to-peer connections, modem connections, the Internet, and the like, are also considered networks. In a client/server network, a plurality of nodes are interconnected such that the various nodes send and/or receive information to/from one another. As shown here, a server node 12 is interconnected to a plurality of client nodes 14 using a connection 16 such as a token ring, Ethernet, telephone modem connection, radio or microwave connection, or the like.

A computer readable medium 18, shown here as a floppy diskette, holds information readable by a computer, such as programs, data, files, etc. As one with ordinary skill in the art will readily appreciate, computer readable media can take a variety of forms, including magnetic storage (such as hard disk drives, floppy diskettes, etc.), optical storage (such as laser discs, compact discs, etc.), electronic storage (such as random access memory "RAM", read only memory "ROM", programmable read only memory "PROM", etc.), and the like. Certain types of computer readable media, which are sometimes described as being nonvolatile, can retain data in the absence of power so that the information is available when power is restored.

Data is often transmitted and shared within or between computer systems. A source of data is sometimes referred to as a content stream. The form of the content stream can vary widely, including electric signals, sound waves, radiation (e.g. light, magnetic waves, etc.), computer readable media, bar codes, and the like. Likewise, the data in a content stream can vary widely, including text, graphics, sound, and the like. One typical example of a content stream is a communication, but is not limited to communications. For instance, content streams include signals over a network. Further examples of content streams include signals internal to a computer, signals to a peripheral device, parameters passed between functions, and the like. Typically, a content stream is associated with a principal, such as a communication coming or going from the principal. The size and complexity of a content stream can range widely, from a simple on/off pulse to an extensive collection of information.

Typically, but not always, a principal is associated with a content stream. A principal is a consumer or provider of information, capable of being uniquely identified (e.g., addressable). Some examples of principals include individuals, computers, programs, devices, and the like. Furthermore, a principal can be single consumer or a group of consumers. A principal's association with a content stream can vary widely, including being the source, recipient, intermediary, etc. of the content stream.

Figure 2:
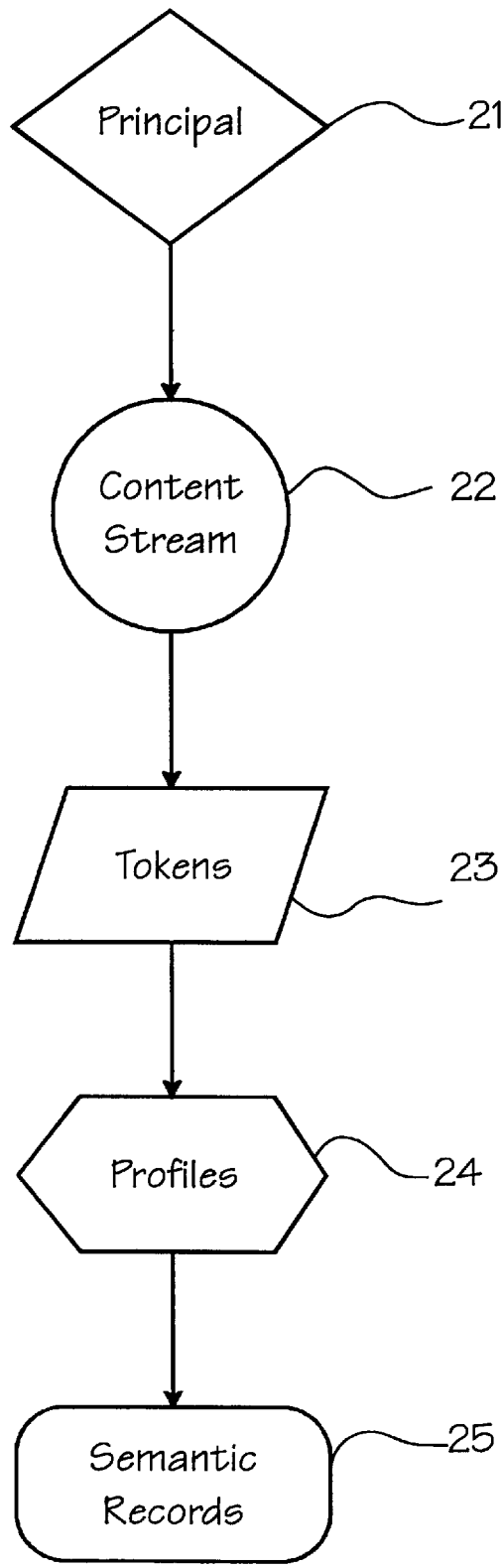
FIG. 2 depicts one possible correlation between a principal, content stream, tokens, profiles and semantic records.

FIG. 2 depicts one example of the invention. The principal 21 is associated with the content stream 22. Often, but not necessarily always, a content stream comprises one or more phrases. A phrase is a granule of the content stream. The size and extent of the granule can be configured based on the application. The nature of the phrase will typically depend of the type of data in the content stream. For instance, in a text-based content stream a phrase could be letter, a word, a sentence, or the entirety of the text. As a further example, in a raster content stream, a phrase could be a pixel or range of pixels in an image. Phrases can take a variety of formations, included nested, overlapped, or the like.

One or more tokens 23 are associated with the content stream 22. A token refers to metadata corresponding to a closed, bounded region of a content stream. Tokens can be associated with any portion of the content stream, including the entire content stream. For instance, a token could be information included with the content stream, such as a header similar to a PICS. As a further example, a token can correspond to one or more phrases in the content stream. The token correspondence is not exclusive to any given region of a content stream. For instance, many tokens can correspond to one region and one token can correspond to many regions.

One or more profiles 24 are each associated with one or more tokens 23. A profile is a collection of tokens. In one embodiment, a profile is a template for a semantic record which are instantiated from the profile. In another embodiment, the profile includes a predefined threshold before a corresponding semantic record will be instantiated. For instance, the threshold can be frequency based on associated tokens, which may be weighted or not for any given tokens. Preferably, a profile corresponds to a given concept or idea.

One or more semantic records 25 are each associated with one or more profiles 24 and one or more principals 21. A semantic record is an instance of a profile. In one preferred embodiment, the semantic record is described in a mathematical model, such as a topological vector space ("TVS"). One with ordinary skill in the art will recognize that a TVS is a concept in functional analysis. One reference that discusses this concept is *Applications of Functional Analysis and Operator Theory* by V. Hutson, which is hereby incorporated by reference. The axis definitions of the TVS are maintained in the profile from which the semantic record was instantiated. Preferably, the TVS acts as the context for a frequency function, and the semantic record will be destructed if a predetermined and configurable threshold of the frequency function is not satisfied.

Figure 3:
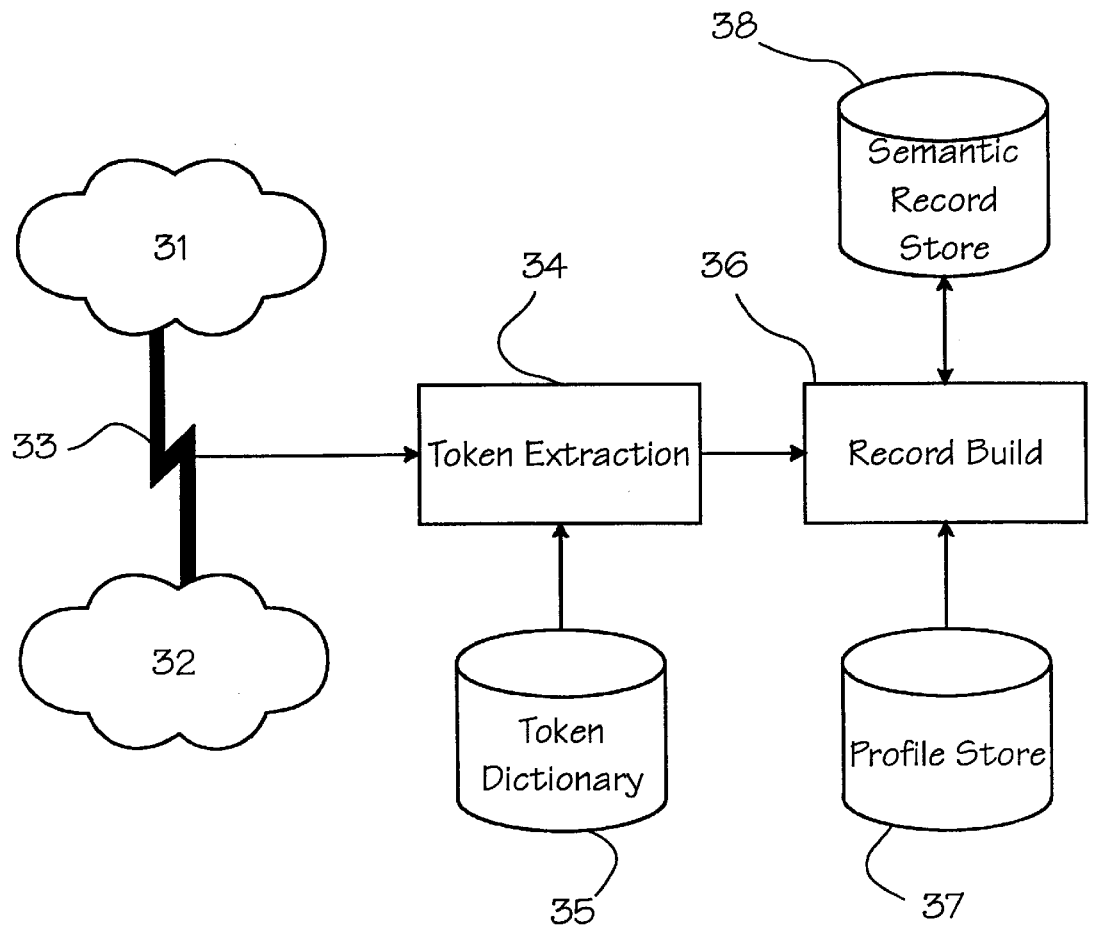
FIG. 3 depicts an example of a system for creating semantic records.

FIG. 3 depicts another example of the invention. The two clouds 31, 32 represent a network that has a common connection 33 through which a content stream can be accessed. A token extraction mechanism 34, such as a process or program having a series of instructions in a computer system, has access to the connection 33 and the content stream. The token extraction mechanism 34 extracts or determines tokens from the content stream. In this example, the content stream is parsed based on its phrases. The parsed phrases are then referenced in the token dictionary 35 to determine the corresponding tokens.

The token dictionary 35 is a collection of tokens. The token dictionary 35 can be a simple list of one or more tokens, or can contain additional information. For instance, in the present example the token dictionary 35 includes information for associating tokens with phrases and/or vice versa. In one embodiment, the token dictionary is stored a computer readable medium in the form of a database.

While token extraction and the token dictionary is not limited to text-based content streams, consider the following illustration of a portion of token dictionary which could be applied to a text-based content stream:

| Phrase | Token(s) |
| --- | --- |
| java | coffee, computer language,. . . |
| latte | coffee,. . . |
| espresso | coffee,. . . |
| skim | milk,. . . |
| cream | milk,. . . |
| milk | milk,. . . |

When the phrases "java", "latte" or "espresso" are parsed from the content stream, the token dictionary is referenced to determine that the token "coffee" is associated with the content stream. As such, one can determine that the principal associated with the content stream is referencing "coffee." Likewise, when the phrases "skim" or "cream" are parsed, one can determine that the associated principal is referencing "milk." As illustrated in the last entry, the phrase can be very similar to the associated token.

Phrase extraction can be literal (i.e. parsing the content stream directly) or interpretive (i.e. interpreting the content of the content stream). Some examples of interpretive phrase extraction include relevancy determinations (e.g. such as those found on Internet search engines such as ALTAVISTA, EXCITE, etc.), linguistic morphology, tagged content streams, and the like. For instance, using an interpretive phrase extraction, such as linguistic morphology, the word "cool" could be evaluated against the context in which it is used to determine whether the associated token should be "cold" or "excellent".

The extracted tokens are then passed to the record build mechanism 36, which could be embodied in a process, a program, or other forms. The record build mechanism 36 accesses the profile store 37, which contains a plurality of profiles. In the present example, the profile store is a database contained on a computer readable medium. The extracted tokens are compared with the profiles. Each profile comprises a plurality of associated tokens. Each extracted token may participate in the instantiation of multiple semantic records.

Preferably, each profile defines a semantic concept. For instance, a profile may correspond to "drinks", which profile could include the tokens "coffee", "milk", "soft drinks", etc. The profiles act as a class definition where the resulting semantic record is an instantiation of the corresponding class. The profiles are instantiated into semantic records based on the extracted tokens. Further, the semantic records are associated with the principal associated with the content stream from which the tokens were extracted. In one embodiment, the profiles additionally store a frequency threshold of tokens along with other qualifying criteria for the creation of, admission of tokens to, deletion of tokens from, or deletion/destruction of—one or more semantic records.

The instantiated profiles are stored in the semantic record store 38, which stores a plurality of semantic records. In one embodiment, the semantic record represents the content stream in a semantic space, such as a TVS. A semantic space is a representation of the domain of interest. The semantic space is modeled by a TVS such that the axis of the TVS spans the domain of interest in some metric that can measure the position, direction, and distance between any two points in the TVS. For example, measuring how much a person likes milk requires us to develop a means and method to measure and quantify the "likes milk" metric to be placed on the "likes milk" axis of the TVS. Another example would be to represent "taste" in a TVS. In this case there could be at least three axes, "bitter," "sweet," and "salty." Extracting tokens describing the taste of a thing will yield semantic records that can be positioned in the TVS such that things that taste like "apples" will tend to clump together in the multi-axis space of the TVS. As such, each semantic record is a function of a principal, the associated content stream, and time. Each semantic record contains a variety of points within the TVS representing or characterizing the principal's activity within that semantic space. One reference that discusses mapping in a TVS is *Latent Semantic Indexing Is An Optimal Special Case Of Multidimensional Scaling* by Brian T. Bartell, Garrison W. Cottrell, and Richard K. Belew, which is hereby incorporated by reference.

Preferably, the semantic record store is dynamic. As time transpires and the content stream varies, new semantic records are added by the record build mechanism 36. Likewise, existing semantic records are updated and modified by the record build mechanism 36 based on the changing content stream associated with the principal. In other words, the cloud of points within the TVS can vary, thereby changing the strength, frequency, location, etc. of the principal within that semantic space. Preferably, after a period of time of a predefined threshold inactivity defined in the associated profile, a given semantic record can be destructed by the record build mechanism 36.

Figure 4:
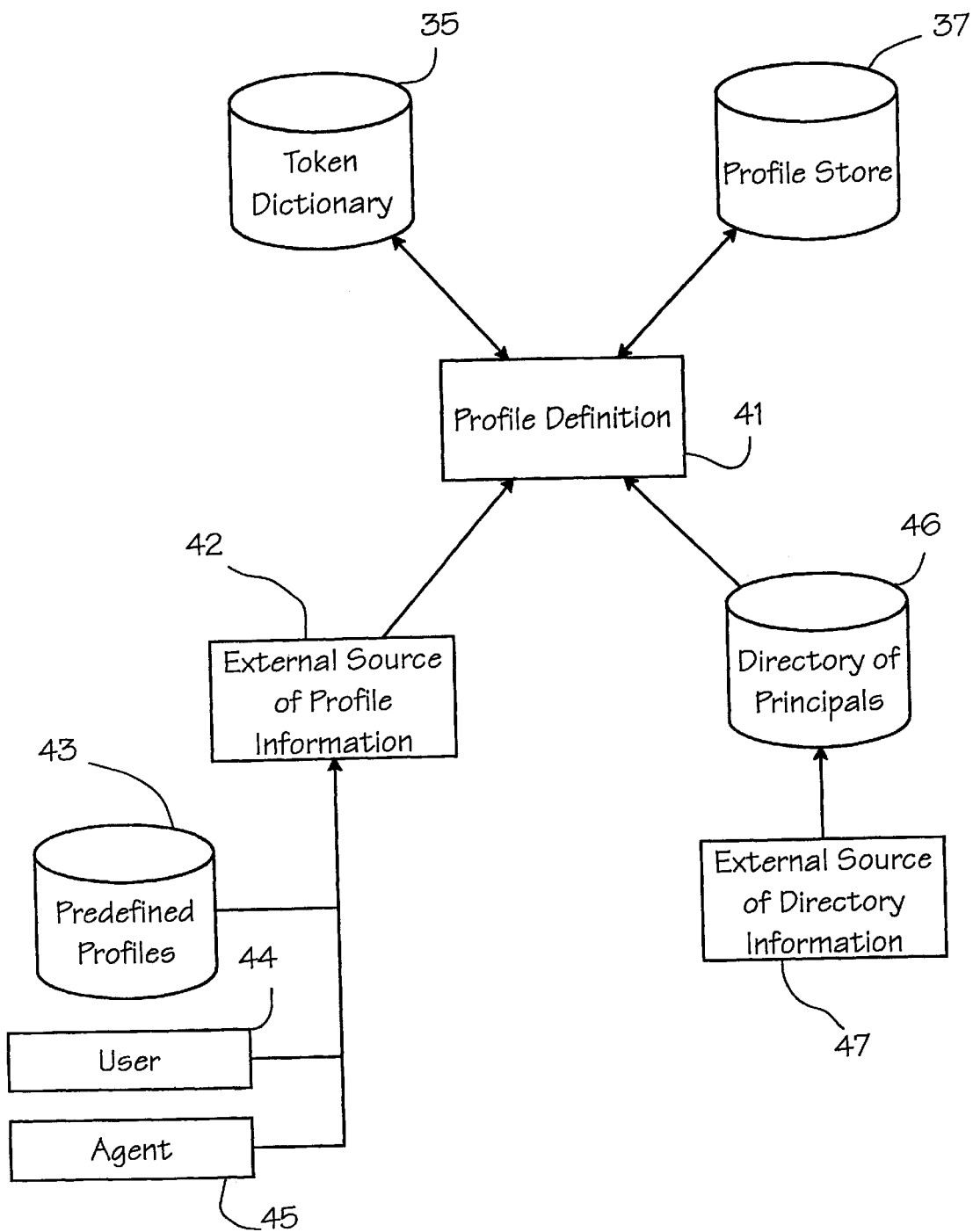
FIG. 4 depicts an example of a system for managing a token dictionary and profile store.

FIG. 4 depicts an example of a system for managing the token dictionary 35 and the profile store 37. Preferably, both the token dictionary 35 and the profile store 37 are editable and configurable. In this example, the profile definition mechanism 41 is the principal engine for such management.

The profile definition mechanism 41 reads and writes to the token dictionary 35 and the profile store 37. Preferably, the profile definition mechanism 41 consolidates the information such that the definition of entries in the token dictionary 35 and the profile store 37 are normalized to each other.

Information about the various principals are retrieved from the directory of principals 46, such as a database, a distributed directory, an index, or the like. The directory of principals 46 is editable and updatable through the external source of directory information 47. The external source of profile information 42 interfaces with the profile definition mechanism 41 so as to update and modify the token dictionary 35 and the profile store 37. For instance, predefined profiles 43, user 44 input, agent 45 input, and the like can be used to modify the token dictionary 35 and the profile store 37.

Figure 5:
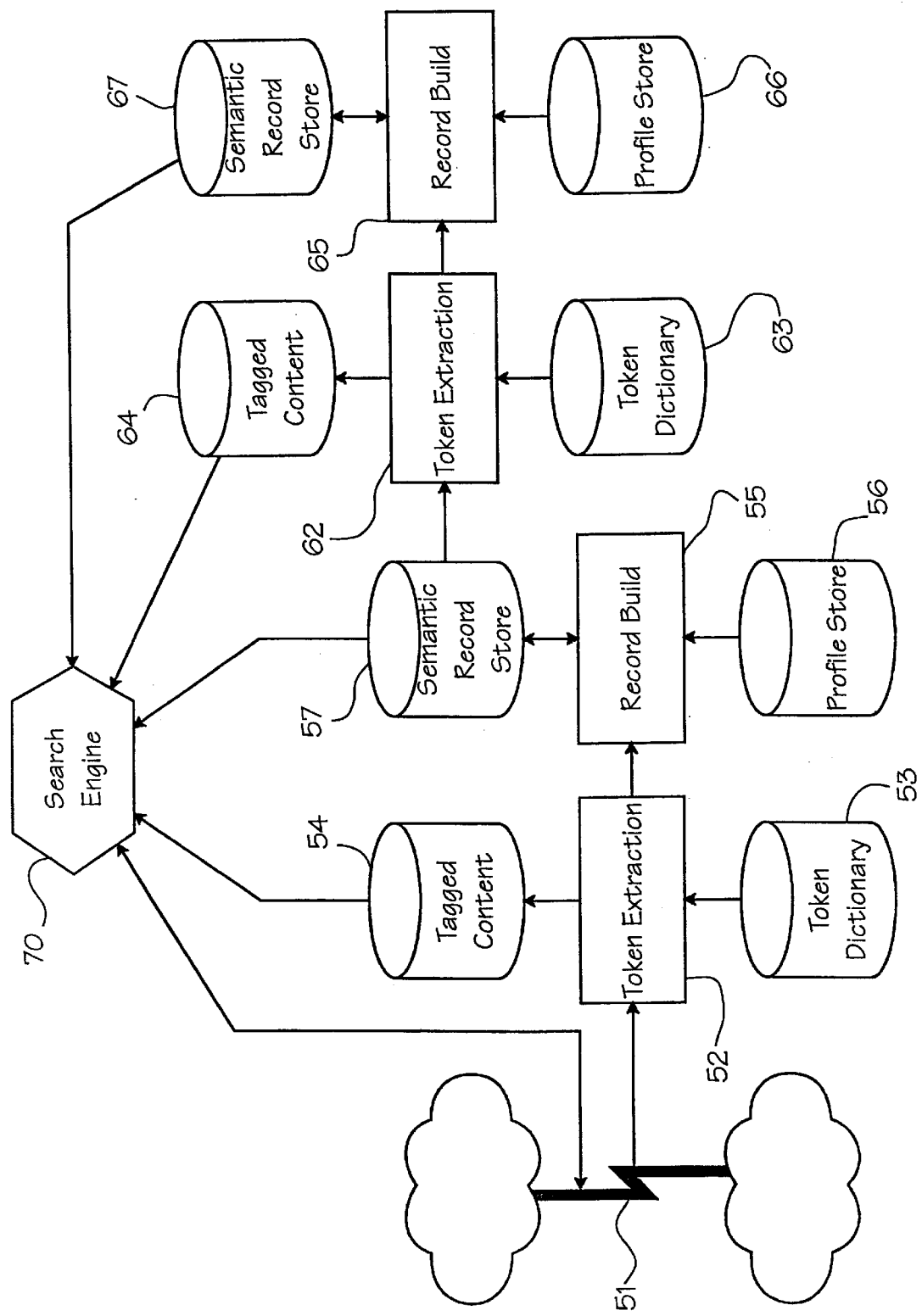
FIG. 5 depicts another example of a system for creating and searching semantic records.

FIG. 5 illustrates yet another example of the present invention. The connection 51 has access to a content stream. The token extraction mechanism 52 parses phrases from the content stream, which phrases are resolved to one or more tokens by referencing the token dictionary 53. The resolved phrases and tokens are stored as tagged content 54, which can be accessed by other mechanisms and processes. Preferably, the presence of a token can be mapped back to the associated phrase using the tagged content 54. The record build mechanism 55 receives the extracted tokens from the token extraction mechanism 52. The profile store 56 is accessed and where appropriate semantic records are instantiated from profiles. The semantic records are then stored in the semantic record store 57.

The search engine 70 allows the tagged content 54 and semantic record store 57 to be searched. Further, two or more semantic records can be compared to one another. For instance, for a given semantic space like a TVS, each profile with a defined mapping to that TVS may be represented as a scalar field or state function which evolves though time. The methods of functional analysis and operator theory can be applied to the state functions, and the results of such methods can be used to compare the various semantic spaces. For instance, semantic records could be compared to see if the principals are active in the same semantic neighborhood (i.e. near or far from one another), or whether the principals are converging or diverging from one another. Further, the search engine 70 may perform a search based on a request from another search engine 70.

The token extraction mechanism 62 operates to develop a semantic space of a semantic space. The token extraction mechanism 62 parses the semantic records in the store 57 into phrases, which are resolved to tokens in the token dictionary 63. The resolved phrases and tokens are stored as tagged content 64. The extracted tokens are passed to the record build mechanism 65, which accesses the profile store 66 to create semantic records, which are then stored in the semantic record store 67. The new semantic record can be viewed as the first derivative of the semantic records contained in the semantic record store 57. One with ordinary skill in the art will readily recognize that many higher derivatives could readily be created using this teaching.

Figure 6:
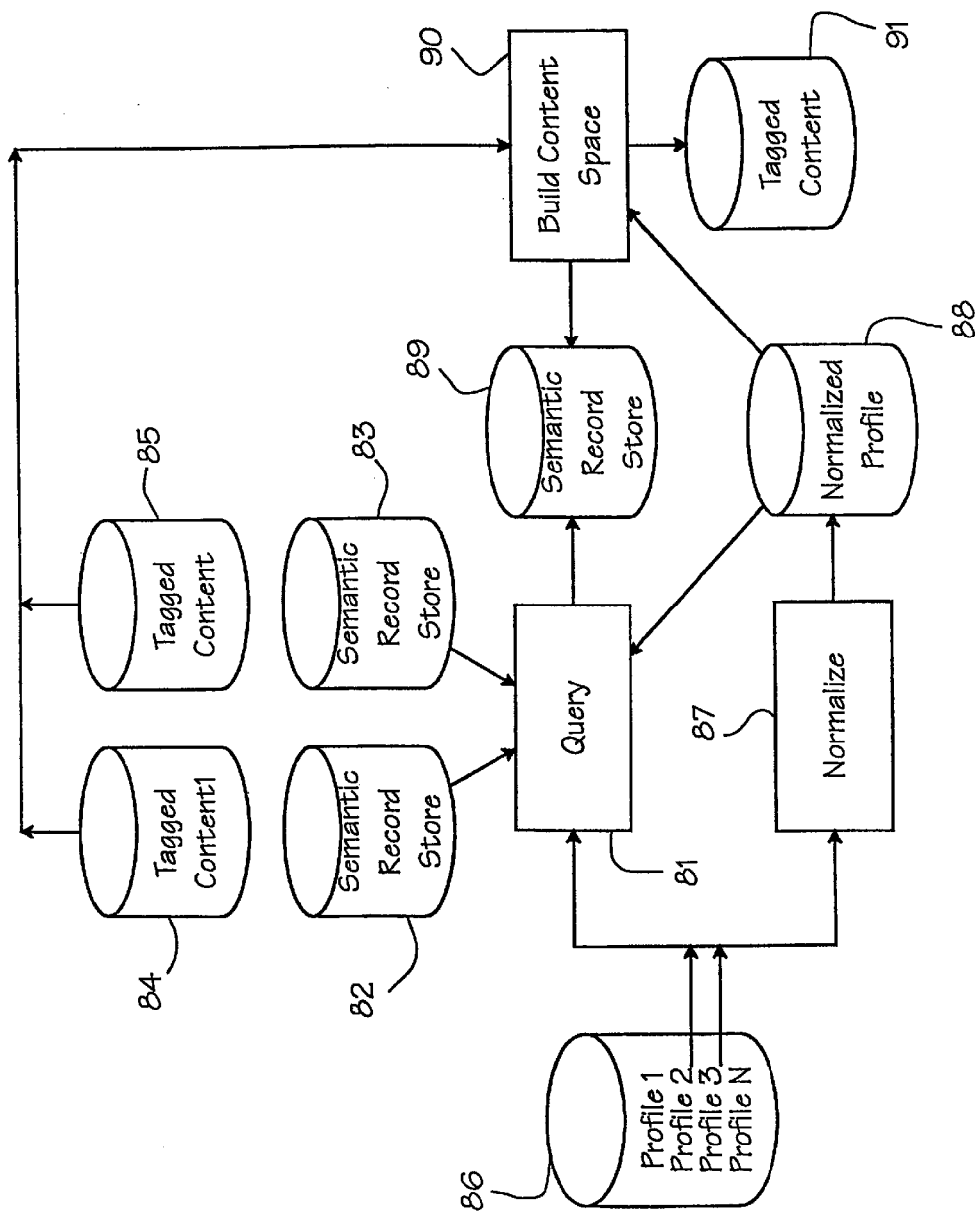
FIG. 6 depicts another example of a system for sending and normalizing semantic records.

FIG. 6 illustrates an embodiment of another aspect of the present invention. The query mechanism 81 uses a plurality of semantic record stores 82, 83 to access a plurality of semantic records. At issue is how to compare semantic records instantiated from different profiles. The normalize mechanism 87 receives from the profile store 86 information about the profiles, in this example Profile 1 and Profile 2. The normalize mechanism 87 defines a normalized profile 88 that allows the transformation from the original profiles to the normalized profile 88. The build content space mechanism 90 receives the tagged content 84, 85, and builds new semantic records using the normalized profile 88. The new semantic records are then stored in the semantic record store 89, which can be readily queried. In addition, the build content space mechanism 90 stores the tagged content 91.

The foregoing description of the preferred embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the amended claims.

We claim:

1. A system for assigning semantic characterization to a content stream, comprising:
   a) a network having a plurality of principals;
   b) the content stream in the network associated with at least one principal, said content stream having a plurality of phrases;
   c) a plurality of tokens each associated with one or more phrases, each token comprising metadata about one or more of the associated phrases;
   d) a plurality of profiles each associated with one or more tokens; and
   e) one or more semantic records each associated with a profile and a principal.

2. A system as recited in claim 1, further comprising a token dictionary having associations between the tokens and the phrases.

3. A system as recited in claim 1, further comprising a profile store having associations between the profiles and its corresponding tokens.

4. A system as recited in claim 1, wherein each profile defines a semantic concept.

5. A system as recited in claim 1, wherein each profile defines a topological vector space corresponding to the associated semantic record.

6. A system as recited in claim 5, wherein the profile further defines a probability density function within the topological vector space.

7. A system as recited in claim 1, further comprising a means for comparing one or more semantic records.

8. A system as recited in claim 1, further comprising a means for managing the tokens and profiles.

9. A method in a computer system for assigning semantic characterization to a content stream, comprising the steps of:
   a) accessing the content stream;
   b) extracting tokens from the content stream, each token comprising metadata about a part of the content stream;
   c) associating one or more profiles with the extracted tokens; and
   d) representing at least a portion of the content stream in a semantic space corresponding to one or more profiles.

10. A method as recited in claim 9, wherein the step of extracting comprises:
    parsing the content stream into phrases; and
    abstracting metadata about the phrases.

11. A method as recited in claim 10, wherein the step of abstracting comprises the steps of:
    a) accessing a token dictionary having associations between the tokens and the phrases; and
    b) determining tokens from the token dictionary based on the parsed phrases.

12. A method as recited in claim 9, wherein the step of representing comprises instantiating a profile.

13. A method as recited in claim 12, wherein the profile is instantiated only if a token threshold is satisfied.

14. A method as recited in claim 9, further comprising the step of comparing at least a portion of the semantic space with one or more portions of other semantic spaces.

15. A method as recited in claim 14, wherein the step of comparing comprises normalizing the semantic spaces.

16. A method as recited in claim 9, further comprising the step of creating a second semantic space based on the semantic space.

17. A method as recited in claim 9, further comprising the step of querying the semantic space.

18. A method as recited in claim 9, wherein the step of representing occurs only if a frequency threshold of tokens is satisfied.

19. A computer readable medium for assigning semantic characterization to a content stream, comprising instructions capable of performing the method of claim 9.

20. A method in a computer system for assigning semantic characterization to a content stream, comprising the steps of:
    a) accessing a content stream;
    b) parsing the content stream into phrases;
    c) determining one or more tokens at least partially based on the phrases parsed from the content stream, each token comprising metadata about one or more of the associated phrases;
    d) associating one or more profiles with the tokens;
    e) instantiating a semantic record from the profiles; and
    f) comparing the semantic record with other semantic records.

* * * * *

UNITED STATES PATENT AND TRADEMARK OFFICE
CERTIFICATE OF CORRECTION

PATENT NO. : 6,108,619                                     Page 1 of 1
DATED : August 22, 2000
INVENTOR(S) : Carter et al.

It is certified that error appears in the above-identified patent and that said Letters Patent is hereby corrected as shown below:

Title page, Item [54] and Column 1, lines 1-4,
"METHOD AND APPARATUS FOR SEMANTIC CHARACTERIZATION OF GENERAL CONTENT STREAMS AND REPOSITORIES" should read
-- SEMANTIC CHARACTERIZATION OF GENERAL CONTENT STREAMS AND REPOSITORIES --

Title page,
Item [56], References Cited, U.S. PATENT DOCUMENTS, insert the following:
-- 5,317,507    5/1994    Gallant         707/532
    5,325,298    6/1994    Gallant         704/9
    5,694,523   12/1997    Wical           706/45
    5,940,821    8/1999    Wical           707/3
    5,970,490   10/1999    Morgenstern   707/10 -- should be listed;

Column 5,
Line 23, "of--one" should read -- of one --.

Signed and Sealed this

Sixth Day of January, 2004

JAMES E. ROGAN
*Director of the United States Patent and Trademark Office*